(12) United States Patent
Ali et al.

(10) Patent No.: US 9,481,765 B2
(45) Date of Patent: Nov. 1, 2016

(54) SYNTHESIS OF A DIALLYLAMMONIUM/SO$_2$ COPOLYMER BEARING PHOSPHO- AND SULFOPROPYL PENDENTS

(71) Applicants: King Fahd University of Petroleum and Minerals, Dhahran (SA); King Abdulaziz City for Science and Technology, Riyadh (SA)

(72) Inventors: Shaikh Asrof Ali, Dhahran (SA); Shamsuddeen Abdullahi Haladu, Dhahran (SA)

(73) Assignees: King Fahd University of Petroleum and Minerals, Dhahran (SA); KIng Abdulaziz City for Science and Technology, Riyadh (SA)

(*) Notice: Subject to any disclaimer, the term of this patent is extended or adjusted under 35 U.S.C. 154(b) by 395 days.

(21) Appl. No.: 14/144,094

(22) Filed: Dec. 30, 2013

(65) Prior Publication Data

US 2015/0183933 A1    Jul. 2, 2015

(51) Int. Cl.

| | | |
|---|---|---|
| *C08G 75/205* | (2016.01) | |
| *C08G 75/20* | (2016.01) | |
| *B01D 65/02* | (2006.01) | |
| *C08G 75/22* | (2006.01) | |
| *C08F 226/06* | (2006.01) | |
| *C08F 26/06* | (2006.01) | |
| *C08F 226/04* | (2006.01) | |
| *C08F 26/04* | (2006.01) | |

(52) U.S. Cl.
CPC .............. *C08G 75/20* (2013.01); *B01D 65/02* (2013.01); *C08G 75/205* (2013.01); *C08G 75/22* (2013.01); *B01D 2321/168* (2013.01); *C08F 26/04* (2013.01); *C08F 26/06* (2013.01); *C08F 226/04* (2013.01); *C08F 226/06* (2013.01)

(58) Field of Classification Search
CPC .... C08G 75/20; C08G 75/205; C08G 75/22; C08F 26/04; C08F 26/06; C08F 226/04; C08F 226/06
See application file for complete search history.

(56) References Cited

U.S. PATENT DOCUMENTS

| | | |
|---|---|---|
| 5,500,323 A | 3/1996 | Baur et al. |
| 7,737,237 B2 | 6/2010 | Destarac |
| 2008/0045420 A1 | 2/2008 | Karagianni et al. |

FOREIGN PATENT DOCUMENTS

| | | |
|---|---|---|
| EP | 0 832 854 A1 | 4/1998 |
| RU | 2 365 596 C1 | 8/2009 |

OTHER PUBLICATIONS

Abu-Thabit, N.Y. et al "Phosphonobetaine/sulfur dioxide copolymer by Butler's cyclopolymerization process", May 2011, European Polymer Journal, 47 Issue 5, 1113-1123.*

* cited by examiner

*Primary Examiner* — Ling Choi
*Assistant Examiner* — David L Miller
(74) *Attorney, Agent, or Firm* — Oblon, McClelland, Maier & Neustadt, L.L.P.

(57) ABSTRACT

A zwitterionic monomer and corresponding cyclopolymerized polyzwitterion (±) (PZ) (i.e. poly(Z-alt-SO$_2$). Phosophonate ester hydroloysis in PZ gave a pH-responsive polyzwitterionic acid (±) (PZA). The PZA under pH-induced transformation was converted into polyzwitterion/anion (±−) (PZAN) and polyzwitterion/dianion (±=) (PZDAN).

7 Claims, 9 Drawing Sheets

SYNTHESIS OF A DIALLYLAMMONIUM/SO₂ COPOLYMER BEARING PHOSPHO- AND SULFOPROPYL PENDENTS

BACKGROUND OF THE INVENTION

1. Technical Field

The present invention relates to a zwitterionic monomer, a polyzwitterion synthesized from the zwitterionic monomer, a pH-responsive polyzwitterionic acid synthesized from the polyzwitterion, a polyzwitterion/anion and polyzwitterion/dianion synthesized from the polyzwitterionic acid, and the corresponding methods by which each compound and polymer is formed and use of the polyzwitterionic acid as an antiscalant.

2. Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

The architecture of Butler's cyclopolymers from diallylammonium salts (Butler G B. Cyclopolymerization and cyclocopolymerization. New York: Marcel Dekker; 1992; Kudaibergenov S, et al.; Polymeric betaines: synthesis characterization and application. Adv. Polym Sci 2006; 201:157-224; Singh P K, et al.; Zwitterionic polyelectrolytes: A review. E-Polymers 2007; 030:1-34; Jaeger W, et al.; Synthetic polymers with quaternary nitrogen atoms-Synthesis and structure of the most used type of cationic polyelectrolytes. Prog Polym Sci 2010; 35:511-77—each incorporated herein by reference in its entirety) has been Recognized as the eighth major structural type of synthetic polymers (Butler G B. Cyclopolymerization. J Polym Sci Part A: Polym Chem 2000; 38:3451-3461; McGrew F C. Structure of synthetic high polymers. J Chem Ed. 1958; 35:178-186—each incorporated hereinby reference in its entirety). These ionic polymers have found manifold applications in industrial processes. Use of sulfur dioxide in the cyclopolymerization protocol provides value added diallyl ammonium salts/SO2 copolymers (Ali S A, et al.; Comparative solution properties of cyclocopolymers having cationic, anionic, witerionic and zwitterionic/anionic backbones of similar degree of polymerization. Polymer 2012; 53:3368-3377; Abu-Thabit N Y, et al.; Phosphonobetaine/sulfur dioxide copolymer by Butler's cyclopolymerization process. Eur Polym J 2011; 47:1113-23; Ali S A, et al.; Synthesis and comparative solution properties of single-, twin-, and triple-tailed associating ionic polymers based on diallylammonium salts. J Polym Sci Part A Polym Chem 2006; 44:5480 94; Umar Y, et al.; The effects of charge densities on the associative properties of a pH responsive hydrophobically modified sulfobetaine/sulfur dioxide terpolymer. Polymer 2005; 46:10709-17—each incorporated herein by reference in its entirety). The nitrogen center in the repeat unit may bear a positive charge as in cationic polyelectrolytes (+). Alternately, the nitrogen center may act as the cationic part of a polyzwitterion (±) containing carboxylate, phosphonate or sulfonate as the negative centers or be the cationic part of a polyampholyte (+−) having a polymer chain containing equal or unequal amounts of opposite charges (Abu-Thabit, N Y, Al-Muallem H A, Ali S A. The pH-responsive Cycloterpolymers of Diallyldimethylammonium chloride, 3(N,N-Diallylammonio)propanesulfonate, and Sulfur dioxide. J Appl Polym Sci 2011; 120:3662-73—incorporated herein by reference in its entirety). Strong intragroup, intra- and inter-chain electrostatic dipole-dipole attractions among the dipolar motifs in polyzwitterions (PZs) lead to a collapsed or globular conformation which can undergo a globule-to-coil transition ("antipolyelectrolyte" effect) in salt (e.g. NaCl) solutions owing to the disruption of the network of ionic cross-links (Wielema T A, et al.; Zwitterionic polymers—I Synthesis of a novel series of poly(vinylsulphobetaines). Effect of structure of polymer on solubility in water. Eur Polym J 1987; 23:947-50; Salamone J C, et al.; Aqueous solution properties of a poly(vinyl imidazolium sulphobetaine. Polymer 1978; 19:1157-62; Dobrynin A V, et al.; Flory Theory of a Polyampholyte Chain. J Phys II 1995; 5: 677-95; Higgs P G, et al.; Theory of Polyampholyte Solutions. J Chem Phys 1991; 94:1543-54—each incorporated herein by reference in its entirety). More effective screening of the positive centers in a (±) PZ by Cl-ions as compared to the screening of the negative charges by Na+ ions results in each dipolar zwitterionic motif having a net negative charge, repulsion among which leads to chain expansion (Corpart J, Candau F. Aqueous solution properties of ampholytic copolymers prepared in microemulsions. Macromolecules 1993; 26:1333-1343; Skouri M, et al.; Conformation of neutral polyampholyte chains in salt solutions: a light scattering study. Macromolecules 1994; 27:69-6—each incorporated herein by reference in its entirety). PZs can serve as an excellent polar host matrix owing to their high dipole moments (Yoshizawa M, et al.; Molecular brush having molten salt domain for fast ion conduction. Chem. Lett. 1999; 889-90—incorporated herein by reference in its entirety). The pH-responsive biomimic PZs have been utilized in various fields including: medical (Chan G Y N, et al.; Approaches to improving the biocompatibility of porous perfluoropolyethers for ophthalmic applications. Biomaterials 2006; 27:1287-95—incorporated herein by reference in its entirety), nanotechnology tools (You Ye-Zi, et al.; Directly growing ionic polymers on multi-walled carbon nanotubes via surface RAFT polymerization. Nanotechnology. 2006; 17:2350-4—incorporated herein by reference in its entirety), cosmetics and pharmaceuticals (Kudaibergenov, S E. Polyampholytes: Synthesis, Characterization, and Application. Plenum Corporation; New York: 2002; Salamone J C, et al.; In: Encycl Polym Sci Eng. Mark, H F, Bikales N M, Overberger, C G, Menges G, Kroschwitz J I. Eds.; John Wiley & Sons, Inc: New York; 1987: 11, 514-30; Mumick P S, Welch P M, Salazar L C, McCormick C L. Water-soluble copolymers. 56. Structure and solvation effects of polyampholytes in drag reduction. Macromolecules 1994; 27:323-31—each incorporated herein by reference in its entirety), procedures for DNA assay (Filippini D, et al.; Computer screen photo-assisted detection of complementary DNA strands using a luminescent zwitterionic polythiophene derivative. Sensors and Actuators B. 2006; 113:410-8—incorporated herein by reference in its entirety), chelation of toxic trace metals (Ni, Cu, Cd, and Hg) in wastewater treatment, drilling-mud additives (Zhang L M, et al.; New water-soluble ampholytic polysaccharides for oilfield drilling treatment: a preliminary study. Carbohydr Polym 2001; 44:255-260—incorporated herein by reference in its entirety), and water in oil emulsions (Didukh A G, et al.; Oil Gas 2004; 4:64-75—incorporated herein by reference in its entirety).

When the monomer which represents repeating units of the polymer contains an ammonium group and a matching anionic group, it belongs to the betaine family and the charges form an inner salt. A distinctive feature of the polymers of the invention is that they are electrically neutral polymers even though the betaine groups have both positive and negative charges. The positive charge is provided by a quaternary ammonium function, and the negative charge is provided by a sulfonate (sulfobetaines) or phosphonate (phosphobetaines) group.

Some copolymers were obtained by copolymerization of acrylamide with carboxybetaine type monomers. Their properties in solution greatly depend on the pH value and they are incompatible with the desired properties. In fact, at a low pH value, the protonation of the carboxylate functions leads to the loss of the zwitterionic character and the copolymer behaves like a cationic polyelectrolyte, thus sensitive to the presence of salt in particular.

The polybetaines described here have the advantage of keeping their zwitterionic character within a wide pH range. Certain acrylaride and sulfobetaine copolymers have already been described, but they result from synthesis processes carried out in the presence of salts, which is of notable importance for the structures obtained.

BRIEF SUMMARY OF THE INVENTION

The foregoing paragraphs have been provided by way of general introduction, and are not intended to limit the scope of the following claims. The described embodiments, together with further advantages, will be best understood by reference to the following detailed description taken in conjunction with the accompanying drawings.

One embodiment of the disclosure includes a zwitterionic monomer.

Another embodiment includes a method for synthesizing and copolymerizing the zwitterionic monomer to form a polyzwitterion (±) (PZ) containing a repeating unit of a diallylammonium group containing both diethylphosphonate and sulfonate functionalities, and a sulfur dioxide unit.

Another embodiment includes a method in which hydrolysis of the phosphonate ester in the (±) (PZ) forms a pH-responsive polyzwitterionic acid (±) (PZA).

Another embodiment includes a method in which the (±) (PZA) undergoes pH-induced transformation and is converted into a polyzwitterion/anion (±−) (PZAN) and a polyzwitterion/dianion (±=) (PZDAN).

Another embodiment includes using the (±) (PZA) as an antiscalant in a reverse osmosis desalinization plant to inhibit or treat the formation of a scale.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
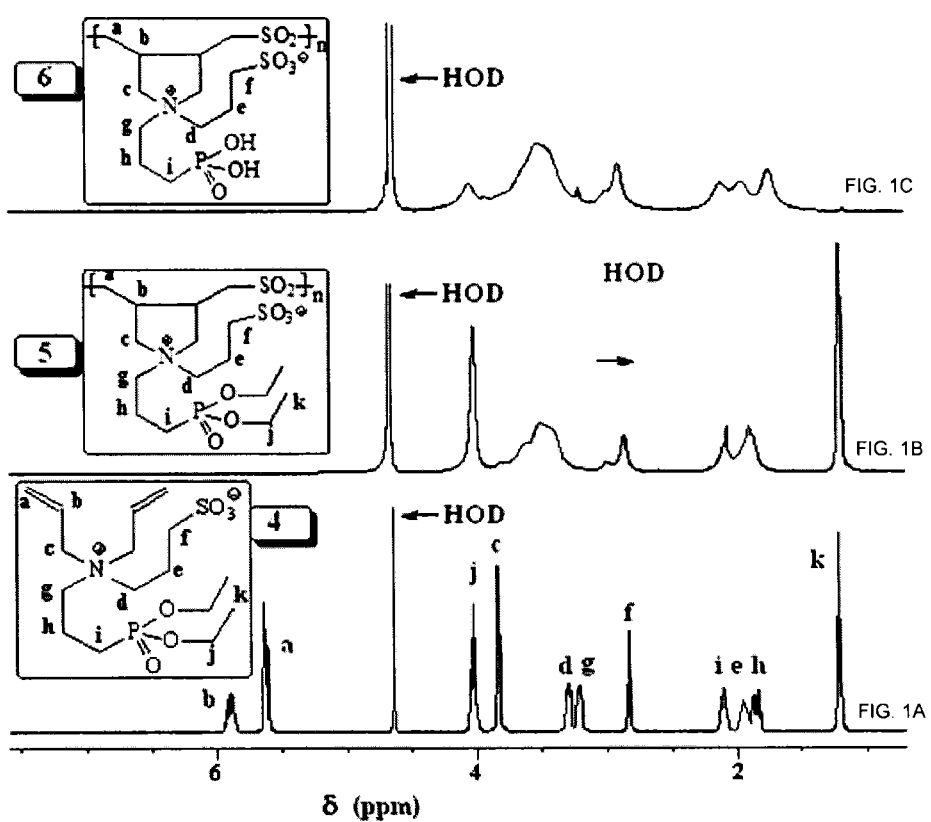
FIGS. 1A-1C show $^1$H NMR spectra of the corresponding polymers in (+NaCl) in $D_2O$.

Referring now to the drawings, wherein like reference numerals designate identical or corresponding parts throughout the several views. The disclosure includes the zwitterionic monomer 4 having the following structure (I):

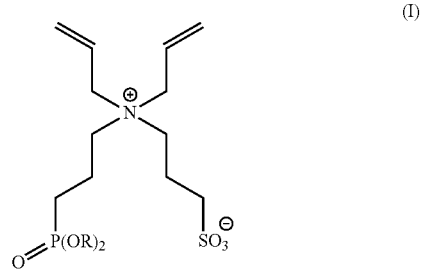

Zwitterionic monomer 4 of formula (I) is a cationic nitrogen-containing compound bonded to two allyl units. The nitrogen atom is further bonded to phospho- and sulfopropyl groups. The formula for each phosphonate group is (—P(O)(OH)$_2$ or —P(O)(OR$_2$) where the "R" group may be the same or different and is preferably a $C_1$-$C_6$ alkyl or $C_6$-$C_{12}$ aryl group selected from the group consisting of methyl, ethyl, propyl, butyl, pentyl, or hexyl or the aryl groups selected from the group consisting of phenyl, tolyl, xylyl, mesityl, naphthyl, biphenyl and any isomers thereof. "R" may be substituted or unsubstituted. Preferably the "R" group of the phosphonate group is an ethyl group.

The copolymerization of the zwitterionic monomer 4 with $SO_2$ to obtain (±) PZ 5, a precursor to pH-responsive polyzwitterion acid (±) (PZA) 6, is presented in Scheme 1. The pH-induced dissociation of dibasic acid (±) (PZA) 6 leads to polyzwitterion/anion (PZAN) (±−) 7 and polyzwitterion/dianion (PZDAN) (+=) 8 whose structures are akin to the type 1 polymers having repeating units with charge asymmetry. The cyclopolymerization protocol has documented very few such copolymers of the type 1 bearing (±−) or (±=) ionic traits on the polymer chains (Mazumder M A J, et al.; Synthesis and solution properties of a new poly (electrolyte-zwitterion). Polymer 2004; 45:125-32; Ali, M M, et al.; Polymerization of functionalized diallyl quaternary salt to poly(ampholyte-electrolyte). Polymer 2000; 41:5591-600; Ali S A, et al.; J Appl Polym Sci, DOI: 10.1002/app.38835—each incorporated herein by reference in its entirety). Cyclopolymers 4-8 having phophonate, sulfonate as well as a $SO_2$ spacer in the same repeating unit is also presented in Scheme 1 where the alkoxy group of the phosphonate is described as an ethoxy group, other alkoxy groups may be used in place of the ethoxy group.

Scheme 1. Cyclopolymers via Butler's cyclocopolymerization protocol.
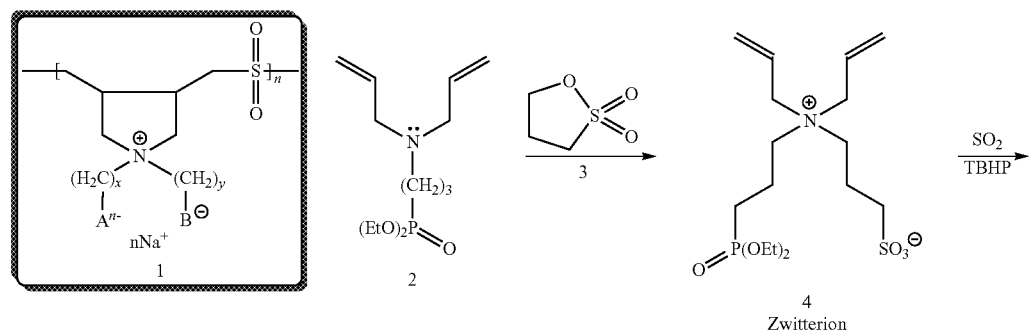
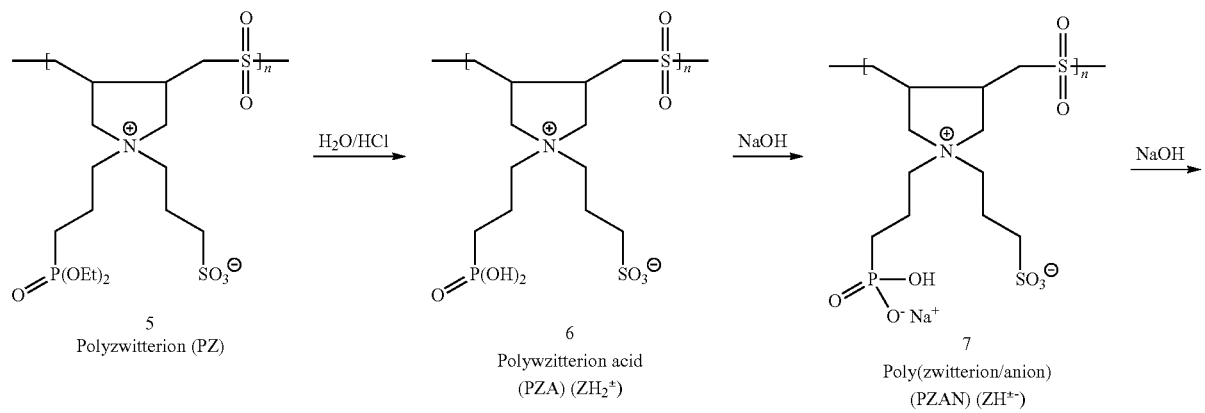
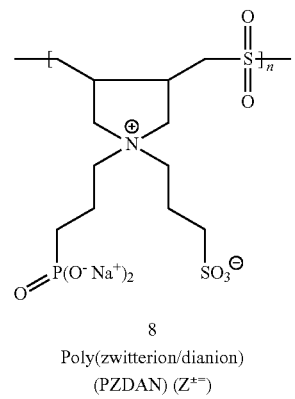
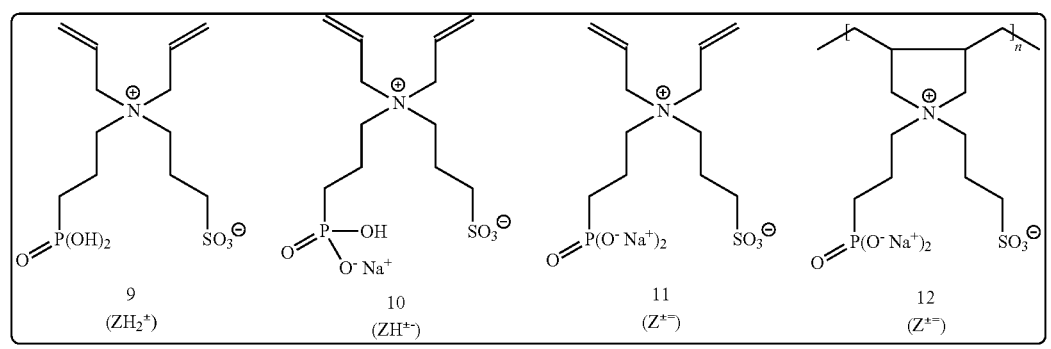

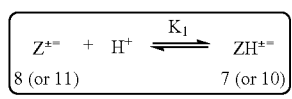

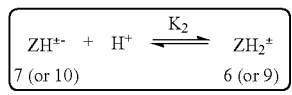

$\log K_i = pH - \log[(1-\alpha)/\alpha]$  Eq 1

$pH = \log K_i^o + n \log[(1-\alpha)/\alpha]$  Eq 2

$\log K_i = \log K_i^o + (n-1) \log[(1-\alpha)/\alpha]$  Eq 3

As depicted in Scheme 1, a polymer 1 serves as a generic model for the polymers polyzwitterion (PZ) 5, polyzwitterionic acid (PZA) ($ZH_2^\pm$) 6, poly(zwitterion/anion) (PZAN) ($ZH^{\pm-}$) 7, and poly(zwitterion/dianon) (PZDA) ($Z^{\pm=}$) 8 that are formed from zwitterionic monomer 4. Polymer 1 has the following structure:

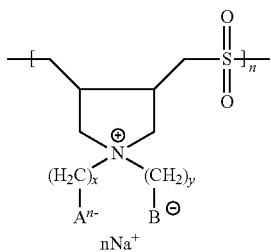

Polymer 1 includes repeating units of a five-membered heterocyclic ring having a nitrogen atom bonded to a linking unit comprising a phosphonate group with the formula for each phosphonate group being —P(O)(OH)$_2$ or —P(O)(OR)$_2$ where the "R" group is preferably an alkyl or aryl group selected from the group consisting of methyl, ethyl, propyl, butyl, pentyl, or hexyl or the aryl groups selected from the group consisting of phenyl, tolyl, xylyl, mesityl, naphthyl, biphenyl and any isomers thereof. "R" may be substituted or unsubstituted. Preferably the "R" group of the phosphonate group is an ethyl group.

The phosphonate and linking groups can be further represented in polymer 1 as —(CH$_2$)$_z$-A$^{n-}$. More specifically, the variable "x" represents the number of methylene units, and "x" is 3. The group "A$^{n-}$" represents a phosphonate group. Variable "n$^-$" represents the charge value of the corresponding phosphonate group and also the coefficient representing the number of atoms of the cationic counter ion having a single charge (the number of counter ions having double charge would therefore be only ½ of the number of counter ions having a single counter ion). The "n" represents the number of repeating units of the corresponding polymer and "n" is at least 10, preferably at least 15, 20, 40, 80, or 100. In one aspect of the invention the polymer is a homopolymer that includes repeating units consisting of only the five-membered ring and the SO$_2$ groups, with the polymer alternately having one or more different terminal units. More preferably, "n" is in the range of 20-1,500; 40-1,400; 80-1,300; or 100-1,200. Cationic materials such as K$^+$, Cu$^+$, or Li$^+$ and dicationic materials such as Ca$^{2+}$, Cr$^{2+}$, Cu$^{2+}$, Fe$^{2+}$, Pb$^{2+}$, Mg$^{2+}$, Mn$^{2+}$, Hg$^{2+}$, Sr$^{2+}$, Sn$^{2+}$, or Zn$^{2+}$ may be used in place of Na$^+$.

The nitrogen atom included in the five-membered heterocyclic ring is also bonded to a linking unit comprising a sulfonate group with the formula (—SO$_3$). The sulfonate group and linking groups can be further represented in polymer 1 as —(CH$_2$)$_y$-B$^\ominus$ in polymer 1. The variable "y" represents the number of methylene units, and "y" is 3. The variable "B" represents the sulfonate group.

A sulfur dioxide group (—SO$_2$—) is further bonded to the five-membered heterocyclic ring through a linking group (—CH$_2$). In one embodiment of the invention, the copolymer includes only repeating units of a diallylammonium unit and a SO$_2$ unit.

As further depicted in Scheme 1, a solution of the monomer 2, which is a tertiary amine, diethyl 3-(diallylamino)propylphosphonate, is treated with a cyclic sulfonate ester of a hydroxy sulfonic acid 3, more preferably in the form of propane sultone to yield a monomeric zwitterion 4. The treatment of monomer 2 with ester 3 yields the resultant anionic sulfonate material and thus balances the cationic charge of the nitrogen atom of the 5-membered heterocyclic ring. The monomeric zwitterion 4 is the monomer 3-[diallyl{3-(diethoxyphosphoryl)propyl}ammonio]propane-1-sulfonate. The monomer is a cationic nitrogen-containing compound bonding to units where the phosphoryl group consists of the formula C—P(O)(OR)$_2$ where the "R" group is preferably an alkyl group selected from the group consisting of methyl, ethyl, propyl, butyl, pentyl, or hexyl or an aryl group selected from the group consisting of phenyl, tolyl, xylyl, mesityl, naphthyl, biphenyl and any isomers thereof. Preferably the "R" group of the phosphonate group is an ethyl group.

The monomeric zwitterion 4 is then treated with a polymerizing agent and SO$_2$. The polymerizing agent includes but is not limited to a peroxide solution, more preferably a tert-butyl hydroperoxide solution (TBHP), which acts to initiate cyclopolymerization of the zwitterionic monomer 4 to yield a polyzwitterion 5. The polyzwitterion 5 contains the core structure following the model of polymer 1, further including the phosphoryl group with the formula C—P(O)(OR)$_2$ where the "R" group is preferably an alkyl group selected from the group consisting of methyl, ethyl, propyl, butyl, pentyl, or hexyl or the aryl groups consisting of phenyl, tolyl, xylyl, mesityl, naphthyl, biphenyl and any isomers thereof. Preferably the "R" group of the phosphonate group is an ethyl group.

The polyzwitterion 5 is then treated with a solution of water and a concentrated inorganic acid, more preferably HCl, to yield a polyzwitterionic acid (PZA) ($ZH_2^\pm$) 6, which contains two hydroxy groups in the formula of the phosphonate group. (PZA) ($ZH_2^\pm$) 6 contains the structure following the model of polymer 1, further including the phosphonate group in the form of C—P(O)(OH)$_2$. Polyzwitterionic acid 6 may be used as an antiscalant in reverse osmosis plants against mineral scales such as CaCO$_3$, CaSO$_4$, Mg(OH)$_2$.

Treatment of (PZA) ($ZH_2^\pm$) 6 with an alkaline material, e.g. NaOH, KOH, Ca(OH)$_2$ and the like, deprotonates one of the hydroxy groups of the phosphonate group to provide a polymeric material having an anionic charge. The anionically charged derivative of (PZA) ($ZH_2^\pm$) 6 is shown as poly(zwitterion/anion) (PZAN) ($ZH^{\pm-}$) 7.

Upon further treatment of (PZAN) ($ZH^{\pm-}$) 7 with additional base, the anionic oxygen atom of the phosphonate group forms a (Na$^+$-O) complex bonded to the phosphorus atom to yield a dianionic charge. The dianionically charged derivative of the (PZAN) (ZH$^{\pm-}$) 7 is shown as poly(zwitterion/dianon) (PZDA) (Z$^{\pm=}$) 8.

Both (PZAN) (ZH$^{\pm-}$) 7 and (PZDA) (Z$^{\pm=}$) 8 may also be used as antiscalants in reverse osmosis plants against mineral scales that contain mineral compounds such as $CaCO_3$, $CaSO_4$, $Mg(OH)_2$.

The dianionically charged monomer 11(Z$^{\pm=}$) and the dianionically charged polymer 12 (Z±=) are comparative examples to PZDAN (Z$^{\pm=}$) 8. Both monomer 11 and polymer 12 do not contain the $SO_2$ repeating unit present in the copolymer PZDAN (Z$^{\pm=}$) 8.

The synthesis of monomer 4 preferably occurs by the method of (Haladu S A, Ali S A. J Polym Sci Part A: Polym Chem: Submitted—incorporated herein by reference in its entirety): 2,2'-Azoisobutyronitrile (AIBN) from Fluka AG (Buchs, Switzerland) was crystallized (ethanol-chloroform). Dimethylsulfoxide (DMSO), dried over calcium hydride overnight, was distilled (bp 64-65° C. at 4 mmHg). A Spectra/Por membrane (MWCO of 6000-8000 from Spectrum Laboratories, Inc) was used for dialysis.

The cyclopolymerization of the monomer 4 preferably occurs by the following method: in a typical cyclopolymerization (see Table 1, entry 3), adsorption of $SO_2$ (20 mmol) in a solution of monomer 4 (7.95 g, 20 mmol) in DMSO (7.2 g) was followed by the addition of initiator (AIBN) (80 mg). The reaction mixture under $N_2$ in a closed flask was stirred at 60° C. for 20 h. Within 30 min, the magnetic bar stopped stirring with the appearance of a transparent thick gel. At the end, the hard polymeric mass was crushed to powder with the aid of acetone, soaked in methanol, filtered, and washed with hot (50° C.) acetone to obtain copolymer (±) PZ 5 (8.0 g, 87%). The thermal decomposition: brown color at 270° C. and black at 290° C. (Found: C, 41.3; H, 7.2; N, 2.9; S, 13.6%. $C_{16}H_{32}NO_8PS_2$ requires C, 41.64; H, 6.99; N, 3.03; S, 13.89%); $v_{max}$ (KBr): 3447 (br), 2985, 1651, 1486, 1370, 1316, 1217, 1100, 1043, 966, 788, 732 cm$^{-1}$. $\delta_P$ (202 MHz, $D_2O$): 30.81 (s). $^1H$ and $^{13}C$ NMR spectra of PZ 5 are shown in respective FIGS. 1 and 2.

Figure 2:
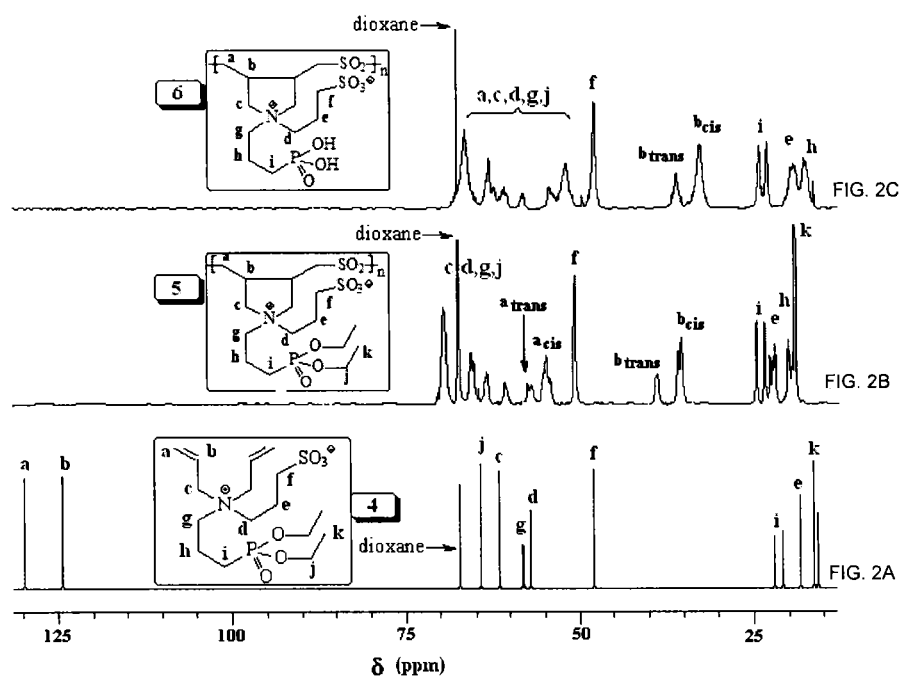
FIGS. 2A-2C show $^{13}$C NMR spectra of the corresponding polymers in (+NaCl) in $D_2O$.

Conversion of PZ 5 to PZA 6 preferably occurs by the following method: PZ 5 (5.0 g, 10.8 mmol) (entry 3, Table 1) was hydrolyzed in water (30 mL) and HCl (40 mL) at 90° C. for 24 h. During dialysis of the homogeneous mixture (24 h), the polymer separated within 1 h as a gel which redissolved after 3 h. The resulting polymer solution was freeze-dried to obtain (±) PZA 6 as a white solid (4.2 g, 96%). The thermal decomposition: the color changed to dark brown and black at 275° C. and 285° C., respectively; (Found: C, 35.2; H, 6.2; N, 3.3; S, 15.5%. $C_{12}H_{24}NO_8PS_2$ requires C, 35.55; H, 5.97; N, 3.45; S, 15.82%); $v_{max}$ (KBr): 3445 (br), 2971, 2928, 1643, 1471, 1411, 1311, 1215 (br), 1132, 1042, 982, 932, 789, 733 cm$^{-1}$. $\delta_P$ (202 MHz, $D_2O$): 25.52 (s). The $^1H$ and $^{13}C$ NMR spectra of PZA 6 are shown in FIGS. 1 and 2.

TABLE 1

Copolymerization[a] of monomer 3 with sulfur dioxide.

| Entry No. | Monomer (mmol) | DMSO (g) | Initiator[b] (mg) | Yield (%) | Intrinsic[c] viscosity (dL g$^{-1}$) | $\overline{M}_W$ | (PDI)[d] |
|---|---|---|---|---|---|---|---|
| 1 | 10 | 3.6 | 30 | 93 | 0.517 | | |
| 2 | 10 | 3.6 | 50 | 92 | 0.578 | 1.37 × 10$^5$ | 2.1 |
| 3 | 20 | 7.2 | 80 | 87 | 0.901 | 2.44 × 10$^5$ | 2.2 |

[a] An equimolar mixture of monomer 4 and $SO_2$ was polymerized at 60° C. for 20 h.
[b] Azobisisobutyronitrile.
[c] Viscosity of 1-0.0625% polymer solution in 0.1N NaCl at 30° C. was measured with Ubbelohde Viscometer (K = 0.005718).
[d] Polydispersity index.

A 2% (w/w) mixture of 5 or 6 in a solvent was stirred at 70° C. for 1 h and the solubility behavior was then checked at 23° C. (Table 2). The solubility behaviors are given in Table 2.

TABLE 2

Solubility[a,b] of PZ 5 and PZA 6.

| Solvent | ε | PZ 5 | PZA 6 |
|---|---|---|---|
| Formamide | 111 | + | + |
| Water | 78.4 | + | + |
| Formic acid | 58.5 | + | + |
| DMSO | 47.0 | + | − |
| Ethylene glycol | 37.3 | + | − |
| DMF | 37.0 | − | − |
| Methanol | 32.3 | − | − |
| Triethylene glycol | 23.7 | − | − |
| Acetic acid | 6.15 | + | − |

[a] polymer (2% w/w) mixture in water was heated at 70° C. for 1 h and then cooled to 23° C.
[b] '+' indicates soluble, '−' indicates insoluble.
[c] 5% (w/w) of PZA 6 was insoluble in water.

Polymer PZA 6 (25 mg, 5 wt %) is insoluble in water (0.5 mL) but soluble in excess water (1.0 mL). A solution of PZA 6 (30 mg, 0.0617 mmol) in 1.04 M HCl (2.30 mL) was titrated with salt-free water until cloudiness. The first appearance of cloud required addition of water (1.35 mL). At this point the concentration of the polymer and HCl are calculated to be 0.0169 and 0.655 M HCl, respectively. Continued addition of water (50.5 mL) leads to disappearance of the cloudy mixture to colorless solution. That translates into the solubility of 0.00114 M polymer in 0.0442 M HCl.

The first and second step protonation constants, $K_1$ and $K_2$, of polymer 8 [ZH$_2$$^{\pm-}$] were determined by potentiometric titrations under $N_2$ in $CO_2$-free water as described elsewhere using PZA 6 [ZH$_2$$^{\pm}$] in salt-free water or 0.1 M NaCl (200 mL) (Tables 3 and 4) of (Al-Muallem H A, Wazeer M I M, Ali S A. Synthesis and solution properties of a new pH-responsive polymer containing amino acid residues. Polymer 2002; 43:4285-95—incorporated by reference herein in its entirety). The Log $K_1$ of —PO$_3$$^{2-}$ (in 8) and Log $K_2$ of —PO$_3$H$^-$ (in 7) are calculated at each pH value by the Henderson-Hasselbalch eq 2 (Scheme 1) where the ratios [ZH$^{\pm-}$]$_{eq}$/[Z]$_o$ and [ZH$_2$$^{\pm}$]$_{eq}$/[Z]$_o$ represent the respective degree of protonation (α). The [ZH$^{\pm-}$]$_{eq}$ and [ZH$_2$$^{\pm}$]$_{eq}$ are the equilibrium concentrations of the first (7) and second (6) protonated species and [Z]$_o$ is the initial concentration of the repeating units.

For the determination of log $K_2$ of —PO$_3$H$^-$ (i.e. [ZH$^{\pm-}$]) using titration of polymer 6 [ZH$_2$$^{\pm}$] with NaOH, [Z]$_o$ and [ZH$_2$$^{\pm}$]$_{eq}$ are related by [ZH$_2$$^{\pm}$]$_{eq}$=[Z]$_o$-C$_{OH}$$^-$-[H$^+$]+[OH$^-$], where C$_{OH}$$^-$, [H$^+$] and [OH$^-$] represent the added concentration of NaOH, and [H$^+$] and [OH$^-$] describe the equilibrium concentrations as calculated from the pH values (Felty W K. Intuitive and general approach to acid-base equilibrium calculations. J Chem Educ 1978; 55(9):576; Barbucci R, Casolaro M, Ferruti P, Barone V, Lelji F, Oliva L. Properties-structure relationship for polymeric bases whose monomeric units behave independently towards protonation. Macromolecules 1981; 14:1203-9—each incorporated herein by reference in its entirety). The log $K_1$ for the first step protonation of —PO$_3$$^{2-}$ (i.e. [Z$^{\pm=}$]) was calculated using volume of the titrant after deducting the equivalent volume from the total volume. In this case, α represents the ratio [ZH$^\pm$]$_{eq}$/[Z]$_o$ whereby [ZH$^{\pm-}$]$_{eq}$ equals [Z]$_o$-C$_{OH}$$^-$-[H$^+$]+[OH$^-$].

The linear regression fit of pH vs. log [(1−α)/α)](eq 2, Scheme 1) gave 'n' and log K°, the respective slope and intercept. The apparent basicity constants $K_i$ is described by eq 3 (Scheme 1) where log K°=pH at α=0.5 and n=1 in the case of sharp basicity constants. Simultaneous protonation of the three basic sites: —PO$_3^=$(log K$_1$≈+8), —PO$_3$H$^-$ (log K$_2$:≈+3) and —SO$_3^-$ (log K$_3$:≈2.1) (Guthrie J P. Hydrolysis of esters of oxy acids: pKa values for strong acids. Can J Chem 1978; 56:2342-54—incorporated herein by reference in its entirety) is least likely due to differences of their basicity constants by about 5 orders of magnitude (vide infra). The basicity constant log K of any base B is the pK$_a$ of its conjugate acid BH$^+$.

Inhibition of calcium sulfate (gypsum) scaling by PZA 6 was carried out using supersaturated solution of CaSO$_4$ containing Ca$^{2+}$ (3×866.7 mg/L i.e., 2600 mg/L) and SO$_4^{2-}$ (3×2100 mg/L i.e. 6300 mg/L) where a typical analysis of a reject brine at 70% recovery from a Reverse Osmosis plant revealed the presence of 866.7 mg/L and 2100 mg/L Ca$^{2+}$ and SO$_4^{2-}$, respectively (Butt F H, et al.; Pilot plant evaluation of advanced vs. conventional scale inhibitors for RO desalination. Desalination 1995; 103:189-198—incorporated herein by reference in its entirety). The concentration of reject brine (i.e., concentrated brine (CB)) is denoted as 1CB.

The evaluation of the newly developed scale inhibitor PZA 6 was performed in 3 CB solutions supersaturated with respect to CaSO$_4$ as confirmed from solubility data of CaSO$_4$. To a solution of 6 CB calcium chloride (60 mL) containing PZA 6 (40 ppm i.e. 40 mg/L) at 40° C.±1° C. was added quickly a preheated (40° C.) solution of 6 CB sodium sulfate (60 mL). The resultant 3 CB solution containing 20 ppm of PZA 6 was stirred at 300 rpm using a magnetic stir-bar, and conductivity measurements were made at an interval of every 10 min initially to quantify the effectiveness of the newly developed antiscalant. The drop in conductivity indicates the precipitation of CaSO$_4$. Induction time was measured with a decrease in conductivity when precipitation started. Visual inspection was carefully done to see any turbidity arising from precipitation.

Copolymerization of zwitterion monomer 4 and SO$_2$ afforded alternate polyzwitterion (PZ) 5 in excellent yields (Scheme 1). An initiator concentration of 4 mg/mmol monomer (entry 3, Table 1) gave the copolymer having the highest intrinsic viscosity [η]. PZ (±) 5 was hydrolyzed in HCl/H$_2$O to give PZA (±) 6 which on neutralization with 1 and 2 equivalents of NaOH is expected to generate polyzwitterion/anion (PZAN) (±–) 7 and polyzwitterion/dianion (PZDAN) (±=) 8.

Figure 3:
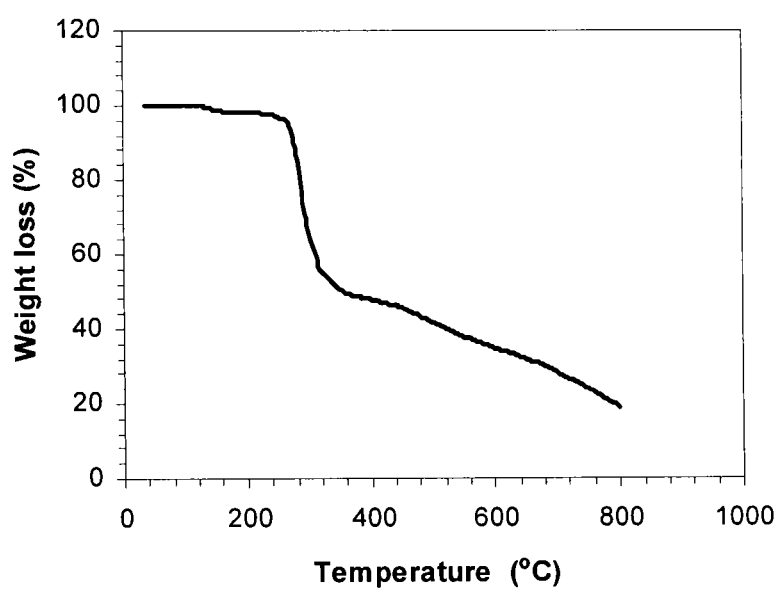
FIG. 3 shows a TGA curve of PZ 5.

PZ 5 was observed to be stable up to around 266° C. as evident from the thermogravimetric analysis (TGA) curve (FIG. 3); an initial loss of 5% was attributed to the loss of moisture. FIG. 3 is a TGA curve of PZ 5. The first steep weight loss of 40% in the temperature range 266-320° C. range was due to the combined losses of sulfopropyl moiety (26%) and SO$_2$ (14%). The second gradual loss of 36% in the 320-800° C. range was the result of decomposition of the phosphonate ester functionality and the release of H$_2$O, NO$_x$ and CO$_2$ gases (Martinez-tapia H S, Cabeza A, Bruque H, Pertierra P, Garcmh S, Aranda M A G. Synthesis and Structure of Na$_2$[(HO$_3$PCH$_2$)$_3$NH]1.5H$_2$O: The First Alkaline Triphosphonate. J Solid State Chem 2000; 151:122-9—incorporated herein by reference in its entirety). The remaining mass of 19% is attributed to P$_2$O$_5$.

The PZ 5 and PZA 6 were found to be soluble in protic solvents having higher dielectric constants (Table 2). Even though PZs are usually insoluble in salt-free water, the water-solubility of the current polymers is attributed to the steric crowding which makes it difficult for the negative charges in sulfonate to move closer to positive nitrogens to impart effective zwitterionic interactions (Haladu, S. A. Ali, S. A. cyclopolymerization protocol for the Synthesis of a New Poly(electrolyte-zwitterion) Containing quaternary nitrogen, carboxylate, and sulfonate functionalities. Eur Polym J 2013; 49:1591-600; Monroy Soto V M, Galin J C. Poly(sulphopropylbetaines): 2 Dilute solution properties. Polymer 1984; 25:254-62—each incorporated herein by reference in its entirety).

A 5 wt % (±) PZA 6 in salt-free water remained heterogeneous while it became homogeneous when diluted to 2.5 wt %. The heterogeneous mixture became homogeneous in the presence of 0.1 M NaCl; however dilution of the homogeneous salt-added solution with salt-free water did not bring back the turbidity. For the pK$_a$ value of 3.61 of —PO$_3$H$_2$ (vide infra) it was calculated that (±) PZA 6 will be dissociated to (±–) PZAN 7 to the extent of 4.4 mol % and 6.1 mol % in respective 5 wt % and 2.5 wt % solution in salt-free water. Greater participation of the zwitterionic/anionic (±–) motifs in the dissociated form thus makes the polymer soluble in 2.5 wt % solution. Note that the presence of NaCl increases the solubility as a result of increased dissociation; for a pK$_a$ value of 2.98 (vide infra) in 0.1 M NaCl, the percent dissociation was calculated to be 8.8 mol % and 12 mol % in 5 wt % and 2.5 wt % solution. The presence of NaCl not only increases the dissociation, it also helps break up zwitterionic interactions thereby increasing its solubility.

Interestingly it was observed during the dialysis of PZA 6 in 6.9 M HCl, precipitation of the polymer occurred within 1 h and its dissolution after 3 h. On further investigation it was observed that PZA 6 (30 mg, 0.0617 mmol) remained soluble in 1.04 M HCl (2.30 mL); titration with water (1.35 mL) led to cloudiness. The polymer (0.0169 M) thus became insoluble in the presence of 0.655 M HCl. Continued addition of water (50.5 mL) to the cloudy mixture leads to a colorless solution at a polymer and HCl concentrations of 0.00114 M and 0.0442 M, respectively. The equilibria presented in Scheme 2 may explain the solubility behavior.

Scheme 2. PZA 6 under pH-induced equilibration.

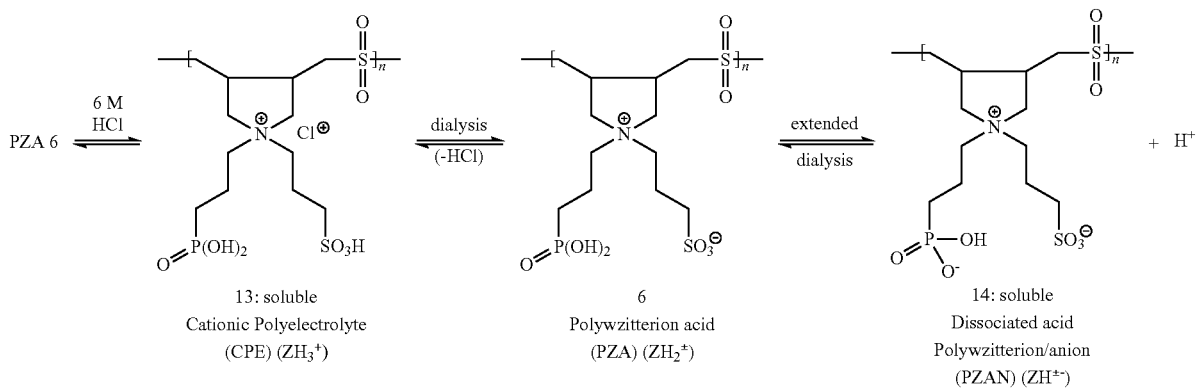

13: soluble
Cationic Polyelectrolyte
(CPE) (ZH$_3^+$)

6
Polywzitterion acid
(PZA) (ZH$_2^±$)

14: soluble
Dissociated acid
Polywzitterion/anion
(PZAN) (ZH$^{±-}$)

Scheme 2 describes the effect of (PZA) ($ZH_2^±$) 6 under pH-induced equilibration. For example, the reaction of (PZA) ($ZH_2^±$) 6 with an inorganic acid or an organic acid such as HCl. HBR, HI or $H_2SO_4$, more preferably the acid being HCl, results in a soluble cationic polyelectrolyte (CPE) ($ZH_3^+$) 13, in which the sulfonate group of the (PZA) ($ZH_2^±$) 6 is protonated to yield a sulfonic acid that is connected to the five-membered heterocyclic ring through an alkylene group. Further, dialysis of (CPE) ($ZH_3^+$) 13 deprotonates the sulfonic acid and regenerates the (PZA) ($ZH_2^±$) 6. Extended dialysis without the presence of HCl yields a soluble dissociated acid polyzwitterion/anion (PZA) ($ZH^{±-}$) 14, in which the one of the hydroxy groups of the phosphonate group is deprotonated to provide a polymeric material having an anionic charge.

While the undissociated (±) PZA 6 by virtue of being zwitterionic is insoluble in neutral water, the presence of HCl pushes the equilibrium towards water-soluble cationic polyelectrolyte (CPE) (+) 13 which upon extended dialysis is transformed to water-insoluble undissociated (±) PZA 6 with the depletion of HCl. Continued dialysis in the absence of HCl establishes the equilibrium: 6-14 in which increased dilution pushes the equilibrium towards (±−) PZAN 14 in which the anionic portion of the zwitterion/anion motifs leads to greater solubility as a result of increased hydration of the expanded polymer backbone.

The strong IR adsorptions around $\approx 1216$ cm$^{-1}$ and $\approx 1042$ cm$^{-1}$ indicate the presence of sulfonate and phosphonate groups in PZ 5 and PZA 6. The two strong bands at $\approx 1315$ cm$^{-1}$ and $\sim 1100$ cm$^{-1}$ were assigned to the asymmetric and symmetric vibrations of $SO_2$ unit. The P=O absorption peaks appeared at 985 (in PZ 5) and 982 cm$^{-1}$ (in PZA 6). FIGS. 1A-1C and FIGS. 2A-2C show the respective $^1$H and $^{13}$C NMR spectra of 4-6. The complete disappearance of any alkene proton or carbon signals ascertains that the termination happens via chain transfer and/or coupling process (Pike R M, Cohen R A. Organophosphorus polymers I. Peroxide-initiated polymerization of diethyl and diisopropyl vinylphosphonate. J Polym Sci 1960; 44:531-8; Butler G B, Angelo R J. Preparation and Polymerization of Unsaturated Quaternary Ammonium Compounds. VIII. A Proposed Alternating Intramolecular-Intermolecular Chain Propagation. J Am Chem Soc 1957; 79:3128-3131—each incorporated herein by reference in its entirety). The absence of the ester group ($OCH_2CH_3$) indicate its removal by hydrolysis as shown in the spectra of 6 FIG. 1C and FIG. 2C. FIGS. 1A-1C are $^1$H NMR spectrum of (a) 4, (b) 5, and (c) 6 (+NaCl) in $D_2O$. FIGS. 2A-2C are $^{13}$NMR spectrum of (a) 4, (b) 5, and (c) 6 (+NaCl) in $D_2O$. The stereochemistry of the substituents at $C_{b,b}$ in the polymers as cis and trans in a 75/25 ratio is similar to earlier findings.

Eq. 4 was developed to give a mathematical expression to rationalize the solution behavior of symmetrically or asymmetrically charged ionic polymers (Everaers R, Johner A, Joanny J-F. Complexation and precipitation in polyampholyte solutions. Europhys Lett 1997; 37:275-280; Candau F, Joanny J-F. In: Salamone J C, editor. Polyampholytes (Properties in Aqueous Solution). Boca Raton, Fla.: CRC Press; 1996p. 5462-76. vol. 7; Wittmer J, Johner A, Joanny J-F. Random and alternating polyampholytes. Europhys Lett 1993; 24(4):263-268—each incorporated herein by reference in its entirety).

$$v^* = -\frac{\pi(fl_B)^2}{\kappa_S} + \frac{4\pi l_B \Delta f^2}{\kappa_S^2} \quad (4)$$

where f is the total fraction of charged monomers, $\Delta f$ is the charge imbalance, $I_B$ is the Bjerrum length, and $\kappa_S$ is the Debye-Huckel screening parameter. For symmetrically charged polymers i.e. polymers having equal number of charges of both algebraic signs, the second term in eq. 4 is eliminated by virtue of $\Delta f=0$. In this case the negative excluded volume (v*) indicates contraction to a collapsed coil. The second term in eq 4 describes the shielding of the Coulombic repulsive interactions as a result of $\Delta f \neq 0$. In the event of charge imbalance as well as domination of second term over the first, the positive electrostatic excluded volume (v*) leads to expansion to a semicoil.

Figure 4:
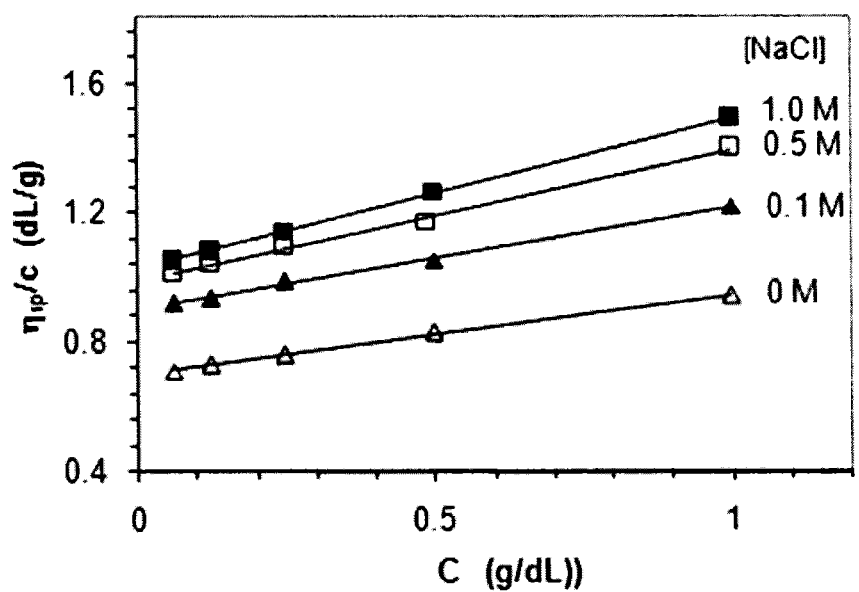
FIG. 4 shows a diagram demonstrating the viscosity behavior in 0.1 M NaCl of different polymers.

The dependence of viscosity of behavior of (±) PZ 5 on the concentration of NaCl is shown in FIG. 4. FIG. 4 is a graph using an Ubbelohde Viscometer at 30° C. that shows the viscosity behavior of (±) PZ 5 in ■ 1 M NaCl, □ 0.5 M NaCl, ▲ 0.1 M NaCl, and △ salt-free water. (Polymer used from entry 3, Table 1). The intrinsic viscosity [η] in 0 M (salt-free water), 0.1 M, 0.5 M and 1.0 M NaCl was measured to be 0.697, 0.901, 0.988, and 1.03 dL/g, respectively. For the electroneutral (±) PZ 5 with $\Delta f=0$, the viscosity values increases with the increase in salt concentrations. The Cl$^-$ ions effectively shield or bind the positive nitrogens whereas Na$^+$ with its large hydration shell cannot reach close enough to shield the anionic charges thus resulting in negation of the electroneutrality of (±) PZ 5. A net negative charge on (±) PZ 5 thus brings the first as well as second terms in eq 4 to be reckoned thereby making the $\Delta f$ lesser negative with the increase of NaCl concentrations. This leads to increase in the viscosity values in compare to viscosity in salt-free water. Note that the jump in the [η] values from salt-free-water to 0.1 M NaCl is much greater than when the solvent is changed from 0.1 M to 0.5 or 1 M NaCl. Lesser changes in the viscosity values at the higher concentrations of salt (0.5 M or more) is attributed to the near completion of screening of the zwitterionic motifs resulting in insignificant electrostatic contribution to the polymer size.

Figure 5:
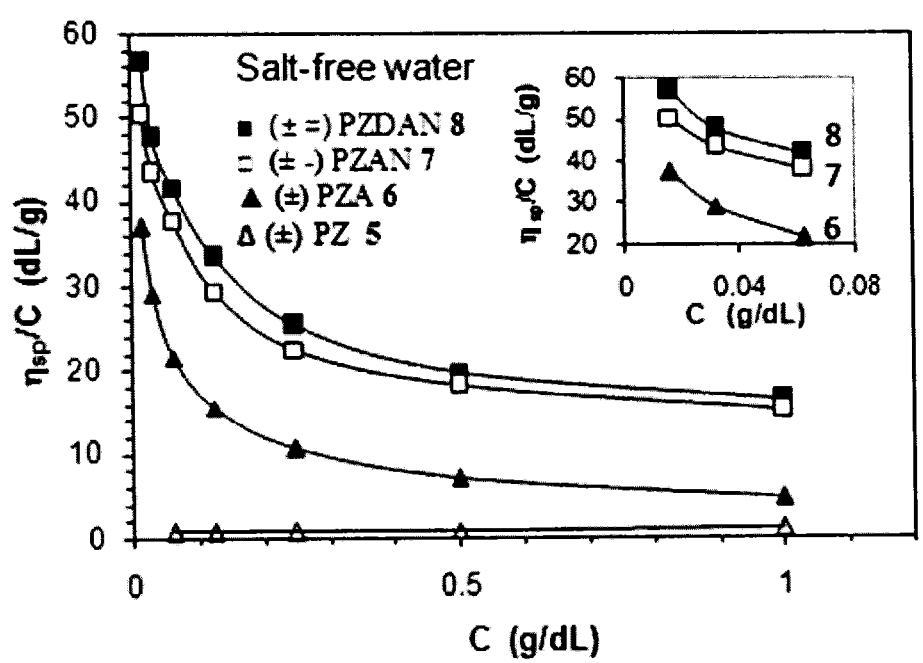
FIG. 5 shows a diagram demonstrating the viscosity behavior in salt-free water of different polymers.

FIG. 5 shows the viscosity behavior of 5-8 in salt-free water. FIG. 5 is a graph using an Ubbelohde Viscometer at 30° C. that shows the viscosity behavior in salt-free water of: (a) ■ (+=) PZDAN 8, (b) □ (±−) PZAN 7, (c) ▲ (±) PZ 6 and (d) △ (±) PZ 5. (All polymers are derived from entry 3, Table 1) [Inset describes the viscosity plot in the dilution range 0.0625-0.0156 g/dL]. Rather than a polyzwitterion, viscosity plots of 6-8 resemble that of a polyelectrolyte i.e. concave upwards. Increase of reduced viscosity with decreasing concentrations of polymer (±) PZA 6 and (±−) PZAN 7 is attributed to their increased dissociation to the zwitterionic/anionic motifs of (±−) PZAN 7 and zwitterionic/dianionic motifs of (+=) PZDAN 8, respectively. Note that (±) PZA 6 has much higher viscosity values than that of (±) PZA 6 as a result of the acid dissociation (FIG. 5).

Figure 6:
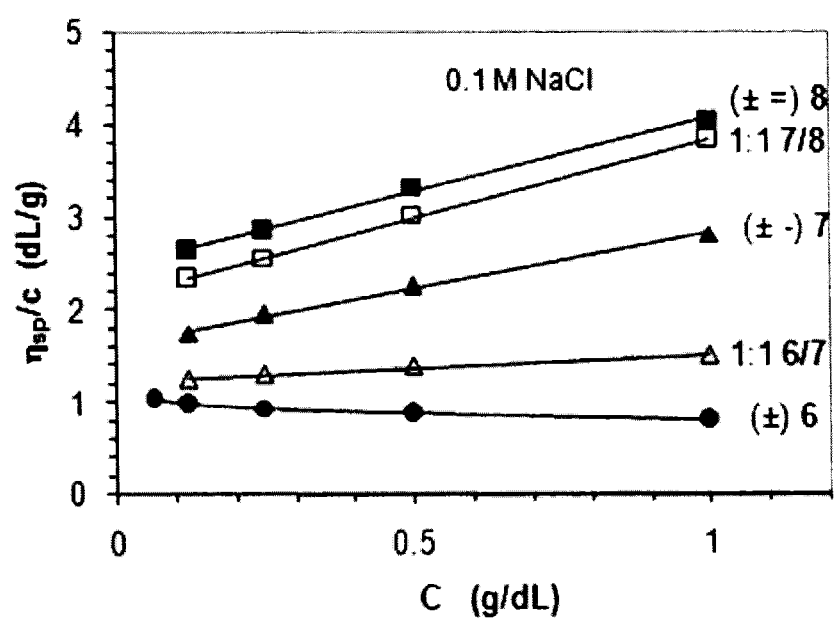
FIG. 6 shows a diagram demonstrating the viscosity behavior in 0.1 M NaCl of different polymers.

Based on the $pK_a$ value of 2.98 in 0.1 M NaCl (vide infra), the extent of dissociation of —$PO_3H_2$ of (±) PZA 6 to —$PO_3H^-$ of (±−) PZAN 7 in solutions having polymer concentration of 1, 0.5, 0.25 and 0.125 g/dL is determined to be 19, 25, 34, and 44 mol %, respectively. FIG. 6 is a graph using an Ubbelohde Viscometer at 30° C. that shows the viscosity behavior in 0.1 M NaCl of: ■ (+=) PZDAN 8, □ 1:1 (±−) PZAN 7/(+=) PZDAN 8; ▲(±−) PZAN 7, △ 1:1 (±) PZA 6/(±−) PZAN 7, and ● (±) PZA 6 (all polymers are derived from entry 3, Table 1). The viscosity plot (FIG. 6) of 7 remains linear since the weak acidity of —$PO_3H^-$ ($pK_a$: 7.9) in 7 leads to insignificant level of dissociation to —$PO_3^{2-}$ of (±=) PZDAN 8: the percent dissociation remains 0.07-0.2 mol % in the concentration range 1-0.125 g/dL. For a $pK_a$ value of 3.61 in salt-free water (vide infra), the corresponding respective percent dissociation is determined as 9.5, 13, 18, and 25 mol %, which are less than that in 0.1 M NaCl. Inspection of FIGS. 5 and 6 reveals that the polyelectrolyte effect in 6 is more pronounced in salt-free water than in 0.1 M NaCl, while the opposite behavior was expected since the increased dissociation to (±−) 7 in 0.1 M NaCl should lead to higher values for the Δf owing to the presence of higher percentage of charge asymmetric zwitterionic/anionic motifs (±−). As discussed earlier, the importance of the second term in eq 4 increases with the increasing Δf values. However, the lower viscosity values in 0.1 M NaCl is attributed to the greater contraction of the polymer chain by shielding of the (±)—$PO_3H^-$ anions by $Na^+$ ions (polyelectrolyte effect) than the expansion caused as a result of disruption of zwitterionic interactions.

FIG. 6 displays the viscosity plots for the polymers 5-8 having identical number of repeating units. Conversion of (±) PZA 6 by addition of 0.5, 1.0, 1.5, and 2 equivalents of NaOH to 1:1 (±) PZA 6/(PZAN) (±−) 7, (PZAN) (±−) 7, 1:1 (PZAN) (±−) 7/(PZDAN) (±=) 8, and (PZDAN) (+=) 8, respectively, results in the increase in viscosity values as a result of increasing concentration of the anionic portions. The anionic motifs thus dominate the viscosity behavior.

Figure 7:
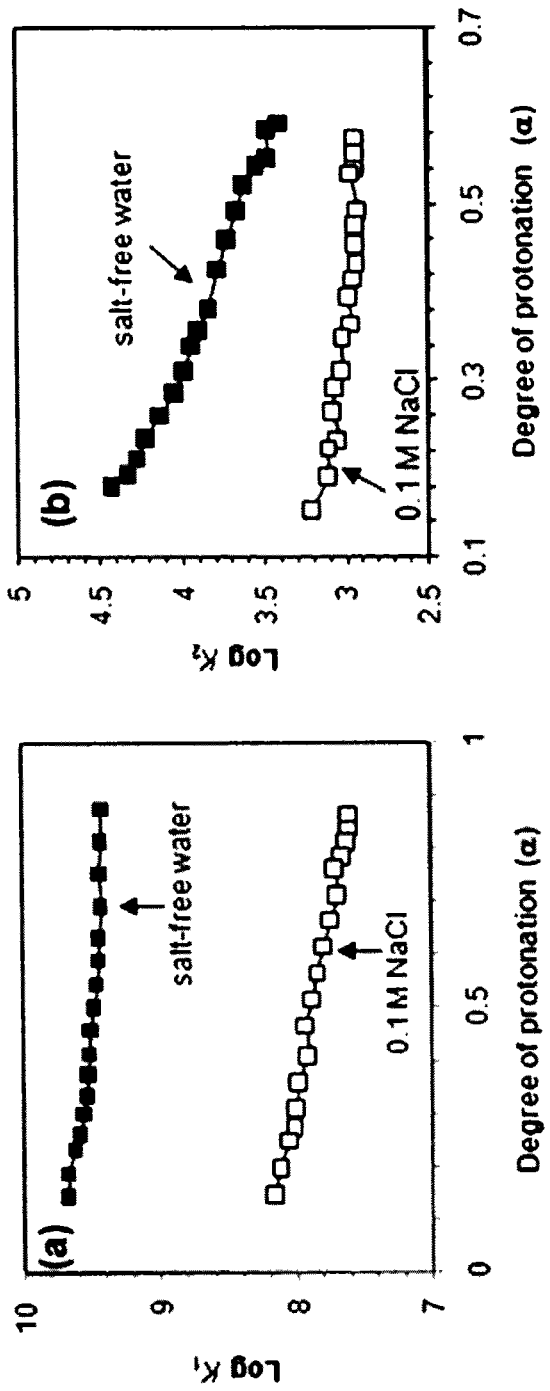
FIG. 7 shows a plot for the apparent (a) log $K_1$ versus degree of protonation (α) and (b) log $K_2$ versus α for (±−) PZAN 7 in salt-free water and 0.1 M NaCl.

The basicity constant log $K_1$ for the protonation of the —$PO_3^{2-}$ (in 8)) in salt-free water and 0.1 M NaCl were determined to be 9.51 and 7.90, respectively (Table 3), while log $K_2$ for the respective protonation of the —$PO_3H^-$ (in 7) were found to be 3.61 and 2.98 (Table 4). The log K values are thus found to be higher than those of the corresponding monomers 10 and 11 (Scheme 1). All the $n_i$ values of greater than 1 ascertain the "apparent" (Barbucci R, Casolaro M, Danzo N, Barone V, Ferruti P, Angeloni A. Effect of different shielding groups on the polyelectrolyte behavior of polyamines. Macromolecules 1983; 16:456-62—incorporated herein by reference in its entirety) nature of the basicity constants as evident from Tables 3 and 4 and also demonstrated in FIG. 7, which reveals a decrease in log K with the increase in α as a direct consequence of a decrease in the electrostatic field force that encourages protonation. FIG. 7 is a plot for the apparent (a) log $K_1$ versus degree of protonation (α) (entry 3, Table 3) for (±=) PZDAN 8 and (b) log $K_2$ versus α for (±−) PZAN 7 in salt-free water and 0.1 M NaCl (entry 3, Table 4). Unlike monomer the basicity constant of a repeating unit in polymer is influenced by the nature of the charges on the neighboring units. It is to be noted that for 11, n values of ≈1 for both log $K_1$ and log $K_2$ in salt-free water as well as 0.1 M NaCl is expected for a small monomer molecule (Tables 3 and 4). Table 3 is shown below.

TABLE 8

Details for the First Protonation of Monomer ZDA ($Z^{+-}$) 11 and Polymer PZDAN 8 ($Z^{+=}$) at 23° C. in Salt-Free Water.

| run | $ZH_2^{\pm}$ or $Z^-$ (mmol) | $C_T^a$ (mol $L^{-1}$) | α-range | pH-range | Points[b] | Log$K_i^{oc}$ | $n_i^c$ | $R^2$,[d] |
|---|---|---|---|---|---|---|---|---|
| For the protonation of -$PO_3^{2-}$ : $Z^{+=}$ + $H^+$ ⇌$^{K_1}$ $ZH^{\pm-}$ | | | | | | | | |
| Polymer in Salt-Free water | | | | | | | | |
| 1 | 0.1759 ($ZH_2^+$) | −0.1016 | 0.79-0.14 | 8.77-10.42 | 14 | 9.47 | 1.18 | 0.9992 |
| 2 | 0.2467 ($ZH_2^+$) | −0.1016 | 0.89-0.13 | 8.57-10.51 | 15 | 9.54 | 1.15 | 0.9974 |
| 3 | 0.3244 ($ZH_2^+$) | −0.1016 | 0.87-0.14 | 8.58-10.45 | 17 | 9.52 | 1.16 | 0.9970 |
| Average | | | | | | 9.51 (4) | 1.16 (2) | |
| Log $K_1^e$ = 9.51 + 0.16 log [(1 − α)/α] | | | | | | | | |
| Monomer in Salt-Free water: Log $K_1^e$ = 7.53 | | | | | | | | |
| Polymer in 0.1M NaCl | | | | | | | | |
| 1 | 0.1995 ($ZH_2^+$) | −0.1016 | 0.78-0.13 | 7.20-9.14 | 14 | 7.90 | 1.54 | 0.9904 |
| 2 | 0.2486 ($ZH_2^+$) | −0.1016 | 0.80-0.13 | 7.15-9.17 | 17 | 7.91 | 1.42 | 0.9917 |
| 3 | 0.3034 ($ZH_2^+$) | −0.1016 | 0.86-0.15 | 6.80-8.92 | 18 | 7.88 | 1.39 | 0.9980 |
| Average | | | | | | 7.90 (2) | 1.45 (8) | |
| Log $K_1^e$ = 7.90 + 0.45 log [(1 − α)/α] | | | | | | | | |
| Monomer in 0.1M NaCl: Log $K_1^e$ =7.12 | | | | | | | | |

[a](−)ve values describe titrations with NaOH.
[b]data points from titration curve.
[c]Standard deviations in the last digit are given under the parentheses.
[d]R = Correlation coefficient.
[e]log $K_i$ = log $K_i^o$ + (n − 1) log [(1 − α)/α].

Table 4 is shown below.

TABLE 4

Details for the Second Protonation of Monomer ZDAN ($Z^{+-}$) 11 and Polymer PZDAN 8 ($Z^{+=}$) at 23° C. in Salt-Free Water.

| run | $ZH_2^{\pm}$ or $Z^-$ (mmol) | $C_T^a$ (mol $L^{-1}$) | α-range | pH-range | Point[b] | Log $K_i^{oc}$ | $n_i^c$ | $R^2$,[d] |
|---|---|---|---|---|---|---|---|---|
| For the protonation of -$PO_3H^-$ : $Z^{\pm-}$ + $H^+$ ⇌$^{K_2}$ $ZH_2^{\pm}$ | | | | | | | | |
| Polymer in Salt-Free water | | | | | | | | |
| 1 | 0.1759 ($ZH_2^+$) | −0.1016 | 0.53-0.23 | 3.44-4.70 | 15 | 3.55 | 2.13 | 0.9986 |
| 2 | 0.2467 ($ZH_2^+$) | −0.1016 | 0.53-0.21 | 3.56-4.97 | 16 | 3.64 | 2.25 | 0.9980 |
| 3 | 0.3244 ($ZH_2^+$) | −0.1016 | 0.59-0.18 | 3.25-5.10 | 18 | 3.63 | 2.17 | 0.9970 |

TABLE 4-continued

Details for the Second Protonation of Monomer ZDAN ($Z^{+-}$) 11 and Polymer PZDAN 8 ($Z^{+=}$) at 23° C. in Salt-Free Water.

| run | $ZH_2^+$ or $Z^-$ (mmol) | $C_T{}^a$ (mol L$^{-1}$) | α-range | pH-range | Point[b] | Log $K_i^{\infty c}$ | $n_i{}^c$ | $R^2$,[d] |
|---|---|---|---|---|---|---|---|---|
| Average | | | | | | 3.61 (5) | 2.18 (6) | |

Log $K_2^e$ = 3.61 + 1.18 log [(1 − α)/α]
Monomer in Salt-Free water: Log $K_2^e$ = 2.74
Polymer in 0.1M NaCl

| 1 | 0.1995 ($ZH_2^+$)[f] | −0.1016 | 0.54-0.20 | 2.90-3.73 | 15 | 2.97 | 1.24 | 0.9929 |
| 2 | 0.2486 ($ZH_2^+$)[f] | −0.1016 | 0.56-0.18 | 2.92-3.88 | 18 | 3.02 | 1.22 | 0.9906 |
| 3 | 0.3034 ($ZH_2^+$)[f] | −0.1016 | 0.58-0.16 | 2.81-3.95 | 19 | 2.94 | 1.29 | 0.9925 |
| Average | | | | | | 2.98 (4) | 1.25 (4) | |

Log $K_2^e$ = 2.98 + 0.25 log [(1 − α)/α]
Monomer 11 in 0.1M NaCl: : Log $K_2^e$ = 2.90

[a](−)ve values describe titrations with NaOH.
[b]data points from titration curve.
[c]Standard deviations in the last digit are given under the parentheses.
[d]R = Correlation coefficient.
[e]log $K_i$ = log $K_i^o$ + (n − 1) log [(1 − α)/α].
[f]titration was carried out in the presence of 1.5-2 mL of 0.1222M HCl to attain the required values of the α.

The higher basicity constants in salt-free water compared to values in 0.1 M NaCl could be attributed to the entropy effects associated with the greater release of water molecules from the hydration shell of the repeating unit that is being protonated in the former medium (Barbucci R, Casolaro M, Ferruti P, Nocentini M. Spectroscopic and calorimetric studies on the protonation of polymeric amino acids. Macromolecules 1986; 19:1856-61—incorporated herein by reference in its entirety). The higher viscosity values in salt-free water (FIG. 5, inset) than in 0.1 M NaCl (FIG. 6) in the dilute solution range 0.03125-0.0625 g/dL ascertains the polymer backbone is highly extended and as such more hydrated in the former medium. A similar concentration range was used for the determination of basicity constants. The higher degree of contraction in salt-free water reflects greater changes in the hydration number which results in entropy-driven greater basicity constants. The highest polyelectrolyte index with a n value of 2.18 is associated with the progressive transformation of (±−) 7 to electroneutral (±) 6 in salt-free water (Table 4) (FIG. 5, inset) during which the negative charges are less accessible to protonation as a result of their being increasingly buried in the globular conformation of polymer backbone having ionic motifs of 6. In 0.1 M NaCl on the other hand the 7 to 6 transformation is associated with a lesser change in viscosity values (FIG. 6) in the dilute solutions hence lesser changes in hydration.

Figure 8:
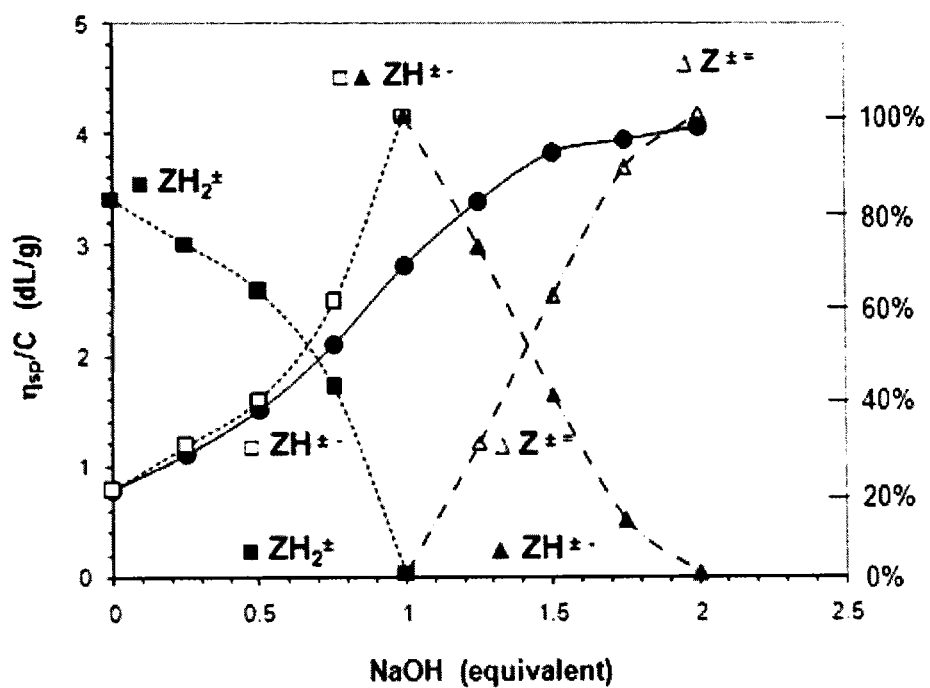
FIG. 8 shows a graph demonstrating the reduced viscosity ($\eta_{sp}/C$) at 30° C. of a solution solution of polymer PZA 6 in 0.1 N NaCl.

FIG. 8 is a graph that displays the reduced viscosity ($\eta_{sp}$/C) at 30° C. of a 0.0247 M (i.e. 1 g/dL) solution of polymer PZA 6 in 0.1 N NaCl (●) versus equivalent of added NaOH at 23° C. Distribution curves (dashed lines) of the various ionized species calculated using eq 2 and pH of the solutions in 0.1 N NaCl at 23° C. FIG. 8 displays a viscometric titration of a 0.0247 M (i.e. 1 g/dL) solution of the polymer PZA 6 in 0.1 M NaCl with NaOH at 23° C.

FIG. 8 also includes the distribution curves of various ionic specie $ZH_2^\pm$ (PZA 6), $ZH^{\pm-}$ (PZAN 7) and $Z^{\pm=}$ (PZDAN 8) as calculated from the basicity constants (vide supra) and pH values. The reduced viscosity increases with the increase in concentration of added NaOH owing to increasing repulsions among the excess negative charges as a result of transformation of zwitterionic species (±) to progressively increasing zwitterionic/anionic (±−) or zwitterionic/dianionic (±=) species.

Operation of desalination plants is often plagued by precipitation (scale formation) of $CaCO_3$, $CaSO_4$, $Mg(OH)_2$, etc. Inhibition of growth rate of crystal formation by commonly used anionic antiscalants like poly(phosphate)s, organophosphates, and polyelectrolytes (Gill J S. A novel inhibitor for scale control in water desalination. Desalination 1999, 124, 43-50; David H, Hilla S, Alexander S. *State of the Art of Friendly "Green" Scale Control Inhibitors: A Review Article*. Ind Eng Chem Res 2011; 50:7601-7—each incorporated herein by reference in its entirety) is attributed to their ability to sequestrate polyvalent cations and alter the crystal morphology at the time of nucleation (Davey R J. The Role of Additives in Precipitation Processes, Industrial Crystallization 81, Eds. S. J. Jancic and E. J. de Jong, North-Holland Publishing Co; 1982:123-135; Spiegler K S, Laird A D K. Principles of Desalination, Part A, 2nd edn., Academic Press; New York: 1980—each incorporated herein by reference in its entirety).

The reject brine in the Reverse Osmosis process has dissolved salts which precipitate in the event of exceeding their solubility limits. Antiscalant behavior of a supersaturated solution of $CaSO_4$ containing 2600 ppm of $Ca^{2+}$ and 6300 ppm of $SO_4^{2-}$ was investigated using conductivity measurements of 3CB solutions in the absence and presence of in the presence of 20 ppm of PZA 6. The results are given in Table 5 and FIG. 9. Table 5 is shown below.

TABLE 5

Concentration of $Ca^{2+}$ at various times at 50° C. in the absence[a] and presence[a] of antiscalant additive PZA 6 (20 mg/L).

| Time (min) | Solution[a] with Inhibitor $Ca^{2+}$ (mg/L) | Blank solution[a] $Ca^{2+}$ (mg/L) | Scale Inhibition (%) |
|---|---|---|---|
| 0 | 19.97 | 19.97 | — |
| 500 | 19.90 | 16.71 | 97.9 |
| 890 | 19.48 | 16.48 | 86.0 |

Figure 9:
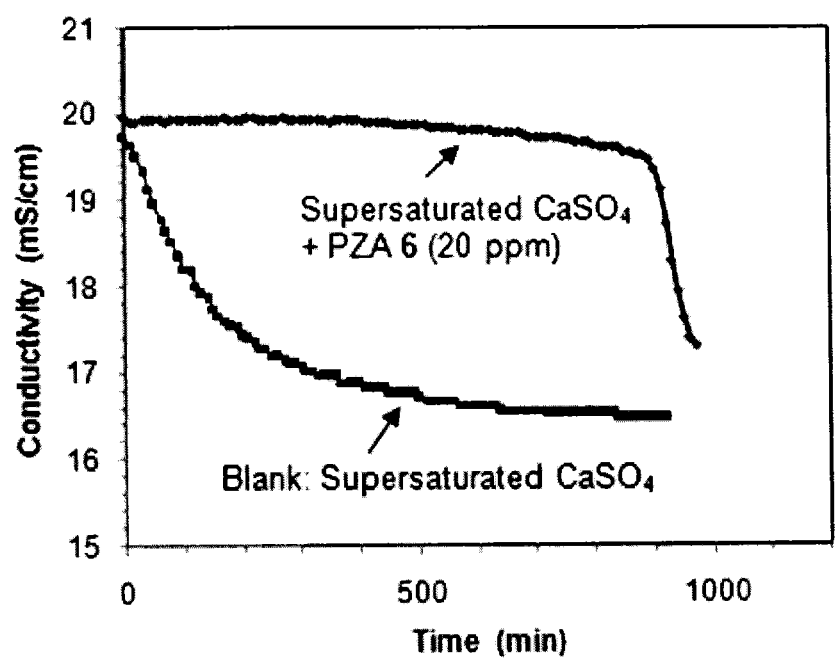
FIG. 9 shows the precipitation behavior of a supersaturated solution of $CaSO_4$ in the presence (20 ppm) and absence of PZA 6.

[a]both solution contained $Ca^{2+}$ and $SO_4^{2-}$ at a concentration of 3 times the concentration of concentrated brine (CB) i.e. [$Ca^{2+}$] = mg/L and [$SO_4^{2-}$] = mg/L A drop in conductivity is indicative of precipitation of $CaSO_4$. Note that precipitation started immediately in the absence of antiscalant (FIG. 9a: Blank). FIG. 9 is a graph that shows the precipitation behavior of a supersaturated solution of CaSO$_4$ in the presence (20 ppm) and absence of PZA 6. To our satisfaction, there was no considerable change in conductivity for about 500 min, registering a 98% scale inhibition as calculated using eq 5:

$$\% \text{ Scale Inhibition} = \frac{[Ca^{2+}]_{inhibited\ (t)} - [Ca^{2+}]_{blank\ (t)}}{[Ca^{2+}]_{inhibited\ (t_0)} - [Ca^{2+}]_{blank\ (t)}} \times 100$$

where $[Ca^{2+}]_{inhibited\ (t_0)}$ is the initial concentration at time zero, $[Ca^{2+}]_{inhibited\ (t)}$ and $[Ca^{2+}]_{blank\ (t)}$ are the concentration in the inhibited and blank solutions at time t. It is assumed that the conductance is proportional to the concentration of the ions. Usually a residence time of ≈30 min for the brine in osmosis chamber is required. It is worth mentioning that neither monomers 4 and 9 nor polymer 5 gave any effective inhibition; since screening experiments based on visual inspection revealed that under the same conditions the system becomes cloudy within 1 h.

Some properties of monomer 11, homopolymer 12 and copolymer 8 are given in Table 6 for the sake of comparison. Table 6 is shown below.

TABLE 6

Comparative properties of monomer (±=) 11, homo- (±=) 12 and cyclopolymer (±=) 8.

| Sample | Log K°$_1$ (n$_1$)$^a$ | | Log K°$_2$ (n$_2$)$^a$ | | IE$^b$ (h) | Polymer yield | [η] (dL g$^{-1}$)$^c$ | $\overline{M}_W$ |
| | Salt-free H$_2$O | 0.1M NaCl | Salt-free H$_2$O | 0.1M NaCl | | | | |
|---|---|---|---|---|---|---|---|---|
| Mono-11$^d$ | 7.53 (1) | 7.12 (1) | 2.74 (1) | 2.90 (1) | — | — | — | — |
| Homo-12$^d$ | 9.32 (1.33) | 8.19 (1.53) | 3.26 (2.16) | 2.83 (1.60) | 98% (8.3 h) | 76% | 0.186 | 4.37 × 10$^4$ |
| Co-8 | 9.51 (1.16) | 7.90 (1.45) | 3.61 (2.18) | 2.98 (1.25) | ≈100% (45 h) | 87% | 2.47 | 2.44 × 10$^5$ |

$^a$n values are written in parentheses.
$^b$IE referes to CaSO$_4$ scale inhibition efficiency with time written in parentheses.
$^c$Viscosity of 1-0.0625% polymer solution in 0.1M NaCl was measured with Ubbelohde Viscometer (K = 0.005718) at 30° C.

Copolymer 8, obtained in higher yield, has much higher intrinsic viscosity and molar mass as compared to homopolymer 12. Both the polymers have similar values for the basicity constants (log K) and polyelectrolyte index (n) even though the copolymer has an additional electron-withdrawing SO$_2$ spacer separating the repeating units. This is not surprising since the spacer group is very far away from the location of the negative charges on the phophonate units. One notable exception is the antiscalant behavior of the polymers; the homopolymer with low molar mass performed better than the copolymer having much higher molar mass.

Cocyclopolymerization of and SO$_2$ afforded the cyclocopolymer PZ 5 in excellent yields. The PZ 5 represents the first example of a poly(zwitterions 4-alt-SO$_2$) (via Butler's cyclopolymerization protocol) containing phosphonate and sulfonate groups in the same repeating unit. The pH-responsive (±) PZA 6 derived from (±) PZ 5 was used to investigate pH-dependent solution properties that involved its conversion to (±–) PZAN 7 and (±=) PZDAN 8 all having identical degree of polymerization. The apparent basicity constants of the —PO$_3$$^{2-}$ and —PO$_3$H$^-$ group in (±–) PZAN 7 and (±=) PZDAN 8 have been determined. PZA 6 at a concentration of 20 ppm was found to be an effective antiscalant in the inhibition of the formation of calcium sulfate scale. The corrosion inhibition activities of both the homo- and copolymer using mild steel in several media are currently under investigation in our laboratory.

The invention claimed is:
1. A polyzwitterion or polyzwitterionic acid having the following formula:

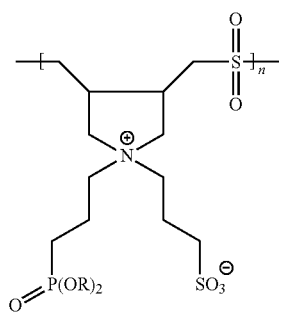

where R is a C$_1$ to C$_6$ alkyl group or a C$_6$-C$_{12}$ aryl group or an H group; and
where n is an integer of 10 or greater.

2. The polyzwitterion of claim 1, wherein the R is CH$_2$CH$_3$; and the number of repeating units n is in the range of 20-1,500.

3. A poly(zwitterion/anion) having the following formula:

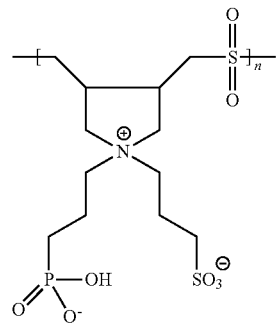

where n is an integer of 10 or greater.

4. The poly(zwitterion/anion) of claim 3, wherein the number of repeating units n is in the range of 20-1,500.

5. A poly(zwitterion/dianion) having the following formula:

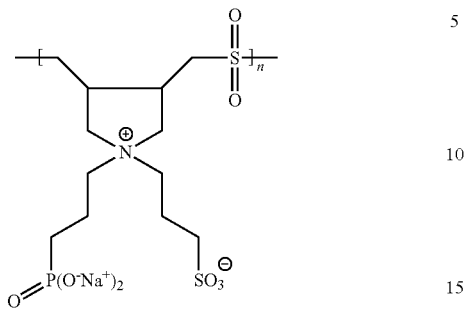

where n is an integer of 10 or greater.

6. The poly(zwitterion/dianion) of claim 5, wherein the number of repeating units n is in the range of 20-1,500.

7. A process for antiscaling, comprising:
   contacting a composition comprising the polyzwitterionic acid polymer of claim 1 with a surface comprising scale to remove the scale from the surface.

* * * * *